(12) United States Patent
Huang et al.

(10) Patent No.: US 9,836,898 B2
(45) Date of Patent: Dec. 5, 2017

(54) SYSTEM AND METHOD OF SECURING ACCESS CONTROL SYSTEMS

(71) Applicant: Honeywell International Inc., Morristown, NJ (US)

(72) Inventors: Ying Huang, Shanghai (CN); Li Ouyang, Shanghai (CN); Zhaocheng Sheng, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/881,848

(22) Filed: Oct. 13, 2015

(65) Prior Publication Data
US 2017/0103593 A1    Apr. 13, 2017

(51) Int. Cl.
G06K 17/00 (2006.01)
G07C 9/00 (2006.01)
(Continued)

(52) U.S. Cl.
CPC .... *G07C 9/00111* (2013.01); *G06F 17/30525* (2013.01); *G06K 7/10009* (2013.01); *G06K 7/10118* (2013.01); *G06K 7/10415* (2013.01); *G06K 7/12* (2013.01); *G07C 9/00031* (2013.01); *G06F 21/35* (2013.01); *G06Q 20/352* (2013.01); *G06Q 20/4014* (2013.01)

(58) Field of Classification Search
CPC ............ G07C 9/00007; G07C 9/00103; G07C 9/00571; G07C 9/00896; G07C 9/00111; G07C 9/00031; G06F 21/31; G06F 17/30525; G06F 21/35; G06K 19/07345; G06K 7/10415; G06K 7/12; G06K 7/10009; G06K 7/10118; H04M 2250/12; H04L 63/0853; H04W 12/06; G06C 20/352; G06C 20/4014
USPC ........................................................ 235/382
See application file for complete search history.

(56) References Cited

U.S. PATENT DOCUMENTS 4,625,100 A * 11/1986 Smith ...................... G07C 1/20
235/377
8,643,475 B1 * 2/2014 Kohno ............. G06K 19/07345
235/380

(Continued)

FOREIGN PATENT DOCUMENTS

EP    2665197 A2    11/2013

OTHER PUBLICATIONS

Honeywell's Tema-Voyager Compact Installation Guide (May 2014); https://extranet.honeywell.com.
(Continued)

Primary Examiner — Claude J Brown
(74) Attorney, Agent, or Firm — Husch Blackwell LLP

(57) ABSTRACT

Systems and methods of securing access control systems are provided. Some methods can include sensing an authorized access card, sensing a directional movement of the access card, determining whether the directional movement of the access card is consistent with authorized movement of the access card, and based on the determination, allowing or denying access to a secured area. In this manner, even if an access card is obtained by an unauthorized user, the unauthorized user will not be able to gain access to a secured region because he will not know the direction to move the access card when presenting the card to a reader.

15 Claims, 3 Drawing Sheets

(51) Int. Cl.
*G06F 17/30* (2006.01)
*G06K 7/10* (2006.01)
*G06K 7/12* (2006.01)
*G06F 21/35* (2013.01)
*G06Q 20/34* (2012.01)
*G06Q 20/40* (2012.01)

(56) References Cited

U.S. PATENT DOCUMENTS

| | | | | |
|---|---|---|---|---|
| 8,891,031 | B2* | 11/2014 | Kim | G06F 3/0412 345/104 |
| 9,306,626 | B2* | 4/2016 | Hall | H04B 5/00 |
| 9,359,795 | B1* | 6/2016 | Gutierrez | E05B 49/00 |
| 2006/0136997 | A1* | 6/2006 | Telek | G01S 11/06 726/5 |
| 2008/0054065 | A1* | 3/2008 | D'Angelo | G06Q 20/341 235/380 |
| 2010/0033299 | A1* | 2/2010 | Davis | G06F 1/1626 340/5.1 |
| 2012/0161923 | A1* | 6/2012 | Finkenzeller | G06K 19/07345 340/5.1 |
| 2013/0015355 | A1* | 1/2013 | Noone | G07C 9/00 250/340 |
| 2013/0062521 | A1* | 3/2013 | Hirayama | G02F 1/13338 250/338.1 |
| 2013/0146662 | A1* | 6/2013 | Randolph | G06K 7/0056 235/439 |
| 2013/0205666 | A1* | 8/2013 | Fortin | E06B 11/022 49/13 |
| 2013/0234836 | A1 | 9/2013 | Davis | |
| 2014/0082569 | A1* | 3/2014 | Borgman | G06F 21/35 715/863 |
| 2014/0118259 | A1* | 5/2014 | Paek | G06F 3/0346 345/158 |
| 2014/0319349 | A1* | 10/2014 | Horie | G01J 1/44 250/338.3 |
| 2015/0006378 | A1 | 1/2015 | Blythe | |
| 2015/0262442 | A1 | 9/2015 | Chen et al. | |
| 2015/0370320 | A1* | 12/2015 | Connor | A61B 5/6831 345/173 |
| 2017/0116833 | A1* | 4/2017 | Beagley | G08B 13/19 |
| 2017/0169643 | A1* | 6/2017 | Huff | G07C 9/02 |

OTHER PUBLICATIONS

Extended European search report for corresponding EP patent application 16193395.7, dated Feb. 28, 2017.

* cited by examiner

SYSTEM AND METHOD OF SECURING ACCESS CONTROL SYSTEMS

FIELD

The present invention relates generally to access control systems. More particularly, the present invention relates to systems and methods of securing access control systems.

BACKGROUND

Access control systems are known in the art. For example, in known access control systems, a user can present an access card to a card reader within a predetermined distance of the reader, and an associated access control system will grant the user access to a region secured by the access control system if the access card is authorized.

However, known access control systems are subject to security threats and challenges. For example, when an access card is lost or stolen, an unauthorized user can use the access card to gain access to the secured region by simply presenting the access card to a card reader in the manner described above.

In view of the above, there is a continuing, ongoing need for improved systems and methods.

DETAILED DESCRIPTION

Figure 1:
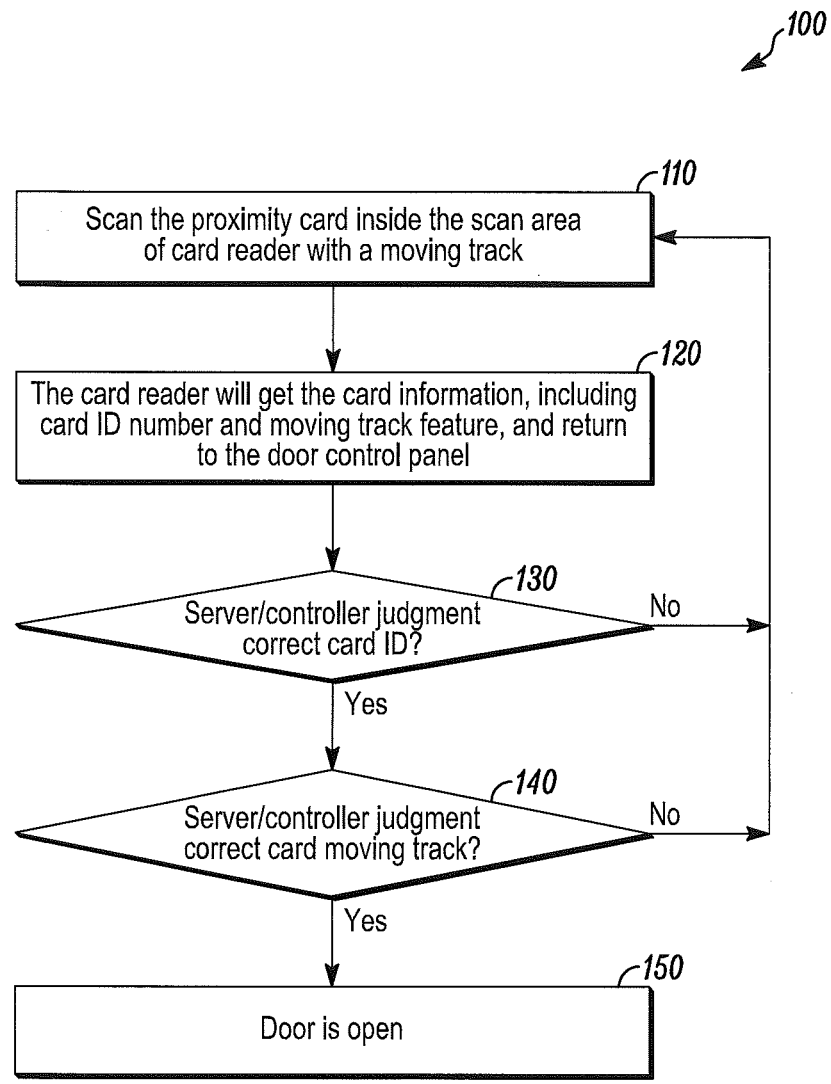
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of securing access control systems. For example, in some embodiments, systems and methods disclosed herein can include one or more infrared (IR) lights and sensors to improve the security of access control systems.

In some embodiments, systems and methods disclosed herein can track the movement of an access card presented to a card reader. In some embodiments, systems and methods disclosed herein can track the three-dimensional movement of an access card presented to a card reader. Accordingly, when an access card is presented to a card reader, systems and methods can confirm that (1) the access card is authorized and (2) that the access card was moved in an authorized manner before granting access to a secured region. Indeed, only an authorized user of an access card will know the authorized movement of the access card presented to a card reader. Accordingly, even if an access card is lost or stolen and obtained by an unauthorized user, the unauthorized user will not be able to gain access to a secured region because he will not know the direction to move the access card when presenting the card to a reader.

In accordance with disclosed embodiments, a card reader of an access control system can include a card tracking device with one or more IR sensors and one or more IR lights, for example, light emitting diodes (LEDs). The sensor can sense the output of the lights, but when an access card is presented to the card reader, the card can block the output from one or more of the lights from reaching the sensor. Accordingly, when an access card is moved within a predetermined distance of the card reader, the sensor can determine the direction in which the card is moved based on the output from the lights that the sensor receives. For example, the sensor can determine whether the card is moved left to right or right to left in an X-direction, whether the card is moved up to down or down to up in a Y-direction, or whether the card is moved back to front or front to back in a Z-direction.

When the access card presented to a card reader is authorized by an associated access control system and the card is moved in an authorized direction in the vicinity of the card reader, the card reader can grant a user access to a secured region. However, even when the access card presented to a card reader is authorized by the associated access control system, when the card is not moved in an authorized direction in the vicinity of the card reader, the card reader can deny access to a secured region. In some embodiments, when access is denied, the card reader can transmit an output signal indicative of the denial. For example, in some embodiments, the card reader can turn on an access denied LED to alert a user that access is denied.

FIG. 1 is a flow diagram of a method 100 in accordance with disclosed embodiments. As seen in FIG. 1, the method 100 can include sensing an access card within a predetermined distance of a card reader as in 110. The method 100 can also include the card reader identifying card information and transmitting the identified card information to an associated control panel as in 120. For example, the card information can include an identification number of the access card and a tracked movement of the access card.

The method 100 can include determining whether the identification number of the access card is authorized as in 130. For example, the card reader, the control panel, or another server or controller can determine whether the identification number of the access card is authorized. If method 100 determines that the identification number is not authorized as in 130, then the method 100 can deny access to a secured area.

However, if the method 100 determines that the identification number is authorized as in 130, then the method 100 can include determining whether the tracked movement of the access card is authorized as in 140. For example, the card reader, the control panel, or another server or controller can determine whether the tracked movement of the access card is authorized. If the method 100 determines that the tracked movement is not authorized as in 140, then the method 100 can deny access to a secured area.

However, if the method 100 determines that the tracked movement is authorized as in 140, then the method 100 can grant access to a secured area as in 150, for example, by opening or unlocking an associated door.

Figure 2:
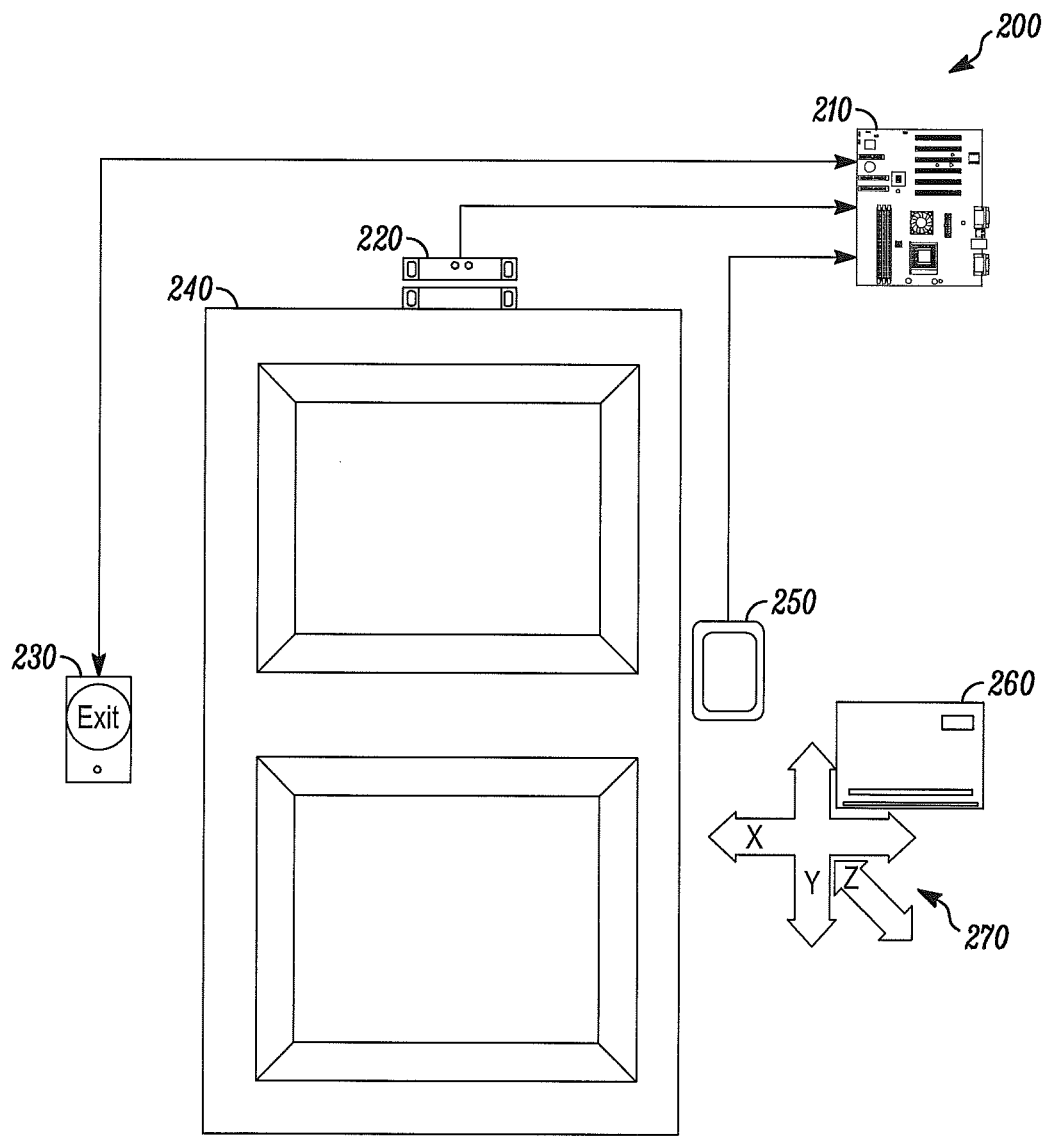
FIG. 2 is a block diagram of a system in accordance with disclosed embodiments.

FIG. 2 is a block diagram of a system 200 in accordance with disclosed embodiments. As seen in FIG. 2, the system 200 can include a control panel 210, a door status sensor 220, an exit button 230, a door 240, a card reader 250, and an access card 260. For example, each of the door status sensor 220, the exit button 230, and the card reader 250 can be in bidirectional communication with the control panel 210.

As seen in FIG. 2, the card reader 250 can sense the access card 260 when the card 260 is within a predetermined distance of the reader 250. The card reader 250 can identify an identification number of the access card 260 as would be known by those of skill in the art, for example, using RFID technology. However, the card reader 250 can also track movement of the access card 260, for example, in the X, Y, or Z directions 270 in accordance with systems and methods disclosed herein.

The card reader 250 can transmit the identification number and the tracked movement of the access card 260 to the control panel 210, and the card reader 250 or the control panel 210 can determine whether the identification number and the tracked movement of the access card 260 are authorized. For example, in some embodiments, the card reader 250 or the control panel 210 can include a database device that includes identification numbers for all authorized access cards. In some embodiments, the database device can also include an indication of authorized card movement for each identification number listed in the database device. When the card reader 250 or the control panel 210 determines that an identification number is listed in the database device, the card reader 250 or the control panel 210 can also determine whether the tracked movement of the access card 260 corresponds with the authorized card movement listed in the database device. If the card reader 250 or the control panel 210 determines that the identification number of the access card 260 is listed in the database device and that the tracked movement of the access card 260 corresponds with the authorized card movement listed in the database device, then the card reader 250 or the control panel 210 can determine that the access card 260 is authorized and transmit a corresponding signal to the door 240 or an associated locking or opening mechanism to open the door 240 to grant access to an area secured by the door 240. However, if the card reader 250 or the control panel 210 determines that the identification number of the access card 260 is not listed in the database or that the tracked movement of the access card 260 does not correspond with the authorized card movement listed in the database device, then the card reader 250 or the control panel 210 can determine that the access card 260 is not authorized or that the access card 260 is in the possession of an unauthorized user and transmit a corresponding signal to the card reader 250 denying access to the area secured by the door 240. For example, in some embodiments, when access is denied, a user interface device, for example, a light or other LED, can be turned on to alert a user of the denied access.

Figure 3:
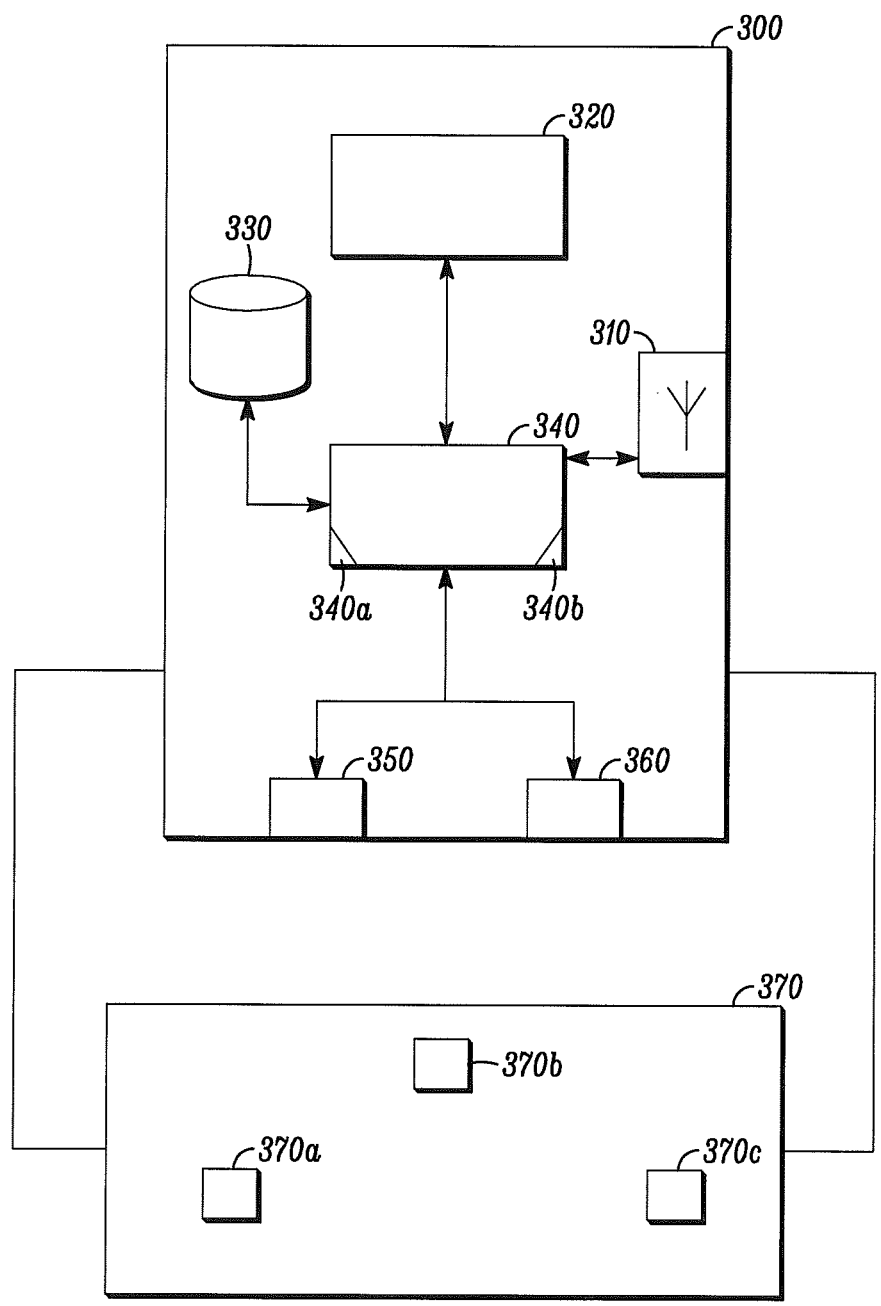
FIG. 3 is a block diagram of a card reader in accordance with disclosed embodiments.

FIG. 3 is a block diagram of a card reader 300 in accordance with disclosed embodiments. As seen in FIG. 3, the card reader 300 can include a transceiver 310 in wired or wireless communication with a control panel and a door lock mechanism. The card reader 300 can also include a user interface device 320, which can include one or more user input mechanisms or user output mechanisms, and a database device 330.

Each of the transceiver 310, the user interface device 320, and the database device 330 can be in bidirectional communication with control circuitry 340, one or more programmable processors 340a, and executable control software 340b as would be understood by one of ordinary skill in the art. The executable control software 340b can be stored on a transitory or non-transitory computer readable medium, including, but not limited to local computer memory, RAM, optical storage media, magnetic storage media, flash memory, and the like. In some embodiments, the control circuitry 340, programmable processor 340a, and control software 340b can execute and control the methods described above and herein.

For example, as seen in FIG. 3, the card reader 300 can include an RFID sensor 350 and an IR sensor 360 in bidirectional communication with the control circuitry 340, programmable processor 340a, and control software 340b. The RFID sensor 350 can sense an RFID tag in an access card placed within a predetermined distance of the sensor 350 and transmit a signal indicative of the RFID tag and an identification number thereof to the control circuitry 340, programmable processor 340a, and control software 340b for further processing thereof. For example, the control circuitry 340, programmable processor 340a, and control software 340b can access the database device 330 to determine whether the identification number is stored in the database device 330 and, therefore, is authorized.

Similarly, the IR sensor 360 can sense output from a card tracking device 370 and transmit a signal indicative of the sensed output to the control circuitry 340, programmable processor 340a, and control software 340b for further processing thereof. For example, in some embodiments, the card tracking device 370 can include a plurality of IR LEDs 370a, 370b, 370c that each output a light that is sensed by the sensor 360. When an access card is moved across the card tracking device 370, the card can sequentially block and unblock light output by the LEDs 370a, 370b, 370c from being sensed by the sensor 360. The sensor 360 can detect the blocking sequence and transmit corresponding signals to the control circuitry 340, programmable processor 340a, and control software 340b for further processing thereof. For example, the control circuitry 340, programmable processor 340a, and control software 340b can determining the direction in which the card is moved, for example, in the +X direction (left to right), in the −X direction (right to left), in the +Y direction, (down to up), in the −Y direction (up to down), in the +Z direction (back to front), or in the −Z direction (front to back). Based on the determined direction of the card movement, the control circuitry 340, programmable processor 340a, and control software 340b can access the database device 330 to determine whether the tracked movement corresponds with authorized movement for the presented access card.

When the control circuitry 340, programmable processor 340a, and control software 340b determine that the identification number is authorized and that the tracked movement is authorized, the control circuitry 340, programmable processor 340a, and control software 340b can transmit a corresponding signal, via the transceiver 310, to a door lock mechanism to unlock the door and grant access to a secured area. Alternatively, when the control circuitry 340, programmable processor 340a, and control software 340b determine that the identification number is not authorized or that the tracked movement is not authorized, the control circuitry 340, programmable processor 340a, and control software 340b can transmit a corresponding signal to the user interface device 320 to output a signal indicative of the denied access.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   sensing an access card;
   sensing a directional movement of the access card by sensing a blocking sequence of a plurality of infrared lights based on when infrared light from one or more of the plurality of infrared lights fails to be sensed by an infrared sensor due to the access card blocking the infrared light from the one or more of the plurality of infrared lights;
   determining whether the directional movement of the access card is consistent with an authorized movement of the access card; and
   based on the determining, allowing or denying access to a secured area.

2. The method of claim 1 further comprising:
   sensing an identification number of the access card; and
   determining whether the identification number is authorized to access the secured area.

3. The method of claim 2 further comprising determining whether the directional movement of the access card is consistent with the authorized movement of the identification number.

4. The method of claim 1 further comprising determining whether the directional movement of the access card is consistent with the authorized movement of the access card identified in a database.

5. The method of claim 1 further comprising allowing the access to the secured area when the directional movement of the access card is consistent with the authorized movement of the access card.

6. The method of claim 1 further comprising denying the access to the secured area when the directional movement of the access card is inconsistent with the authorized movement of the access card.

7. The method of claim 6 further comprising transmitting an output signal indicative of the access being denied.

8. The method of claim 1 further comprising:
   transmitting, to a control panel, a first signal indicative of the directional movement of the access card; and
   receiving, from the control panel, a second signal indicative of whether the directional movement of the access card is consistent with the authorized movement of the access card.

9. A system comprising:
   a sensor;
   a card tracking device;
   a programmable processor; and
   executable control software stored on a non-transitory computer readable medium,
   wherein the card tracking device includes a plurality of infrared (IR) lights,
   wherein the sensor senses the plurality of IR lights and transmits a first signal indicative of the plurality of IR lights as sensed to the programmable processor and the executable control software,
   wherein, based on the first signal, the programmable processor and the executable control software determine a directional movement of an access card presented to the sensor by identifying a blocking sequence of the plurality of IR lights based on when IR light from one or more of the plurality of IR lights fails to be sensed by the sensor due to the access card blocking the IR light from the one or more of the plurality of IR lights, and
   wherein the programmable processor and the executable control software determine whether the directional movement is consistent with an authorized movement of the access card and, responsive thereto, allow or deny access to a secured area.

10. The system of claim 9 wherein the sensor includes an RF sensor.

11. The system of claim 9 wherein the sensor includes an IR sensor.

12. The system of claim 9 further comprising a database that identifies the authorized movement of each of a plurality of authorized access cards, and wherein the programmable processor and the executable control software determine whether the directional movement is consistent with the authorized movement of any the plurality of access cards identified in the database.

13. The system of claim 9 further comprising a transceiver, wherein the programmable processor and the executable control software transmit, to a control panel, via the transceiver, a second signal indicative of the directional movement of the access card and receive, from the control panel, via the transceiver, a third signal indicative of whether the directional movement is consistent with the authorized movement of the access card.

14. The system of claim 9 further comprising an output device, wherein the programmable processor and the executable control software activate the output device responsive to the access being denied.

15. A system comprising:
   a card reader;
   an infrared sensor;
   a plurality of infrared lights;
   a control panel in communication with the card reader;
   a door control mechanism in communication with the control panel; and
   a user interface device in communication with the control panel,
   wherein the card reader senses an access card moving within a predetermined distance of the card reader,
   wherein the card reader identifies an identification number of the access card and a directional movement of the access card,
   wherein the card reader transmits, to the control panel, a first signal indicative of the identification number of the access card and the directional movement of the access card,
   wherein the control panel determines whether the identification number is authorized and whether the directional movement is authorized,
   wherein, when the control panel determines that the identification number is authorized and that the directional movement is authorized, the control panel transmits, to the door control mechanism, a second signal to allow access to an area secured by an associated door,
   wherein, when the control panel determines that the identification number is unauthorized or that the directional movement is unauthorized, the control panel transmits, to the user interface device, a third signal indicative of the access being denied, and
   wherein identifying the directional movement of the access card includes the infrared sensor sensing a blocking sequence of the plurality of infrared lights based on when infrared light from one or more of the plurality of infrared lights fails to be sensed by the infrared sensor due to the access card blocking the infrared light from the one or more of the plurality of infrared lights.

* * * * *